US006793578B2

(12) United States Patent
Luccesi et al.

(10) Patent No.: US 6,793,578 B2
(45) Date of Patent: Sep. 21, 2004

(54) GAMING DEVICE HAVING A PRIMARY GAME OUTCOME EMPLOYED IN A BONUS GAME

(75) Inventors: Matthew Luccesi, Reno, NV (US); Bayard S. Webb, Sparks, NV (US); John G. Gilliland, Reno, NV (US); Randall D. Mead, Reno, NV (US); Johnny L. Palchetti, Reno, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 09/943,976

(22) Filed: Aug. 31, 2001

(65) Prior Publication Data

US 2003/0045343 A1 Mar. 6, 2003

(51) Int. Cl.[7] .................................................. A63F 13/00
(52) U.S. Cl. ............................................ 463/20; 463/25
(58) Field of Search .................... 463/16–22; 273/143.2

(56) References Cited

U.S. PATENT DOCUMENTS 4,624,459 A 11/1986 Kaufman
4,695,053 A 9/1987 Vazquez, Jr. et al.
5,342,047 A 8/1994 Heidel et al.
5,393,057 A * 2/1995 Marnell, II ............. 273/85 CP
5,524,888 A 6/1996 Heidel
5,542,669 A 8/1996 Charron et al.
5,645,486 A 7/1997 Nagao et al.
5,788,573 A 8/1998 Baerlocher et al.
5,823,873 A 10/1998 Moody
5,947,820 A 9/1999 Morro et al.
5,951,397 A 9/1999 Dickinson
5,976,015 A 11/1999 Seelig et al.
5,980,384 A 11/1999 Barrie
5,984,781 A 11/1999 Sunaga
5,997,401 A 12/1999 Crawford
6,015,346 A 1/2000 Bennett
6,059,658 A 5/2000 Mangano et al.
6,062,980 A 5/2000 Luciano
6,089,976 A 7/2000 Schneider et al.
6,095,921 A 8/2000 Walker et al.
6,102,400 A 8/2000 Scott et al.
6,102,798 A 8/2000 Bennett
6,120,031 A 9/2000 Adams
6,126,542 A 10/2000 Fier
6,155,925 A 12/2000 Giobbi et al.
6,159,097 A 12/2000 Gura
6,159,098 A 12/2000 Slomiany et al.
6,162,121 A 12/2000 Morro et al.
6,168,520 B1 1/2001 Baerlocher et al.

(List continued on next page.)

FOREIGN PATENT DOCUMENTS

WO WO 00/12186 3/2000

OTHER PUBLICATIONS

Bonus Spin Brochure and Description of Bonus Spin Game written by IGT, published earlier than 2001.

(List continued on next page.)

*Primary Examiner*—Mark Sager
*Assistant Examiner*—Steven Ashburn
(74) *Attorney, Agent, or Firm*—Bell, Boyd & Lloyd, LLC

(57) ABSTRACT

The present invention is a gaming device having a primary game with a bonus triggering event that affects the outcome of a secondary or bonus game. The number of symbols in the bonus game is dependant on the number of bonus triggering symbols in the bonus triggering event. After generating a number of bonus triggering symbols in the base or primary game, the gaming device animates the bonus triggering symbols and generates a related number of bonus symbols. The gaming device provides an award based on the combination of the bonus symbols.

41 Claims, 8 Drawing Sheets

U.S. PATENT DOCUMENTS

| | | | | | |
|---|---|---|---|---|---|
| 6,173,955 | B1 | | 1/2001 | Perrie et al. | |
| 6,174,235 | B1 | | 1/2001 | Walker et al. | |
| 6,186,894 | B1 | | 2/2001 | Mayeroff | |
| 6,190,254 | B1 | | 2/2001 | Bennett | |
| 6,190,255 | B1 | | 2/2001 | Thomas et al. | |
| 6,224,483 | B1 | | 5/2001 | Mayeroff | |
| 6,231,442 | B1 | | 5/2001 | Mayeroff | |
| 6,231,445 | B1 | | 5/2001 | Acres | |
| 6,234,897 | B1 | | 5/2001 | Frohm et al. | |
| 6,312,334 | B1 | | 11/2001 | Yoseloff | |
| 6,319,124 | B1 | | 11/2001 | Baerlocher et al. | |
| 6,328,649 | B1 | | 12/2001 | Randall et al. | |
| 6,336,863 | B1 | | 1/2002 | Baerlocher et al. | |
| 6,398,218 | B1 | * | 6/2002 | Vancura | 273/138.1 |
| 6,491,584 | B2 | | 12/2002 | Graham et al. | |

OTHER PUBLICATIONS

Royal Riches written by IGT, published earlier than 2001.

Spin Poker written by IGT, published in 2001.

Munsters Brochure and Web Site Page written by IGT, published in 2001.

South Park Brochure written by IGT, published in 2000.

Double Bucks Brochure written by IGT, published earlier than 2001.

Catch a Wave Brochure written by IGT, published in 2001.

Cash Box Advertisement written by Anchor Games, published in 2000.

Yahtzee Advertisement written by Mikohn, published in 2000.

* cited by examiner

GAMING DEVICE HAVING A PRIMARY GAME OUTCOME EMPLOYED IN A BONUS GAME

CROSS REFERENCE TO RELATED APPLICATIONS

This application relates to the following co-pending commonly owned applications: "IMAGE MATCHING GAME METHOD," Ser. No. 09/395,034; "GAMING DEVICE HAVING BONUS SCHEME WITH MULTIPLE SELECTION GROUPS," Ser. No. 09/656,702, U.S. Pat. No. 6,439,995; "GAMING DEVICE HAVING SELECTIVELY ACCESSIBLE BONUS SCHEME," Ser. No. 09/657,916; "GAMING DEVICE HAVING MULTIPLE AWARD ENHANCING LEVELS," Ser. No. 09/626,720, now U.S. Pat. No. 6,328,649; "GAMING DEVICE HAVING MULTIPLE CHOICE LARGE AWARD BONUS SCHEME," Ser. No. 09/686,284; "GAMING DEVICE HAVING A RE-TRIGGERING SYMBOLS BONUS SCHEME," Ser. No. 09/981,133; "GAMING DEVICE HAVING DIFFERENT SETS OF PRIMARY AND SECONDARY REEL SYMBOLS," Ser. No. 09/837,081, now U.S. Pat. No. 6,394,902; "GAMING DEVICE HAVING A BONUS SCHEME INCLUDING A PLURALITY OF SELECTION GROUPS WITH WIN-GROUP OUTCOMES," Ser. No. 09/981,084; "GAMING DEVICE HAVING ODDS OF WINNING WHICH INCREASE AS A PLAYER'S WAGER INCREASES," Ser. No. 09/687,691; "GAMING DEVICE HAVING WAGER DEPENDENT BONUS GAME PLAY," Ser. No. 09/960,880; "GAMING DEVICE HAVING MULTIPLE AWARD ENHANCING LEVELS," Ser. No. 09/967,016, "GAMING DEVICE HAVING MULTIPLE AWARD ENHANCING LEVELS," Ser. No. 09/966,956; "GAMING DEVICE HAVING A RE-TRIGGERING SYMBOL BONUS SCHEME WITH A BONUS SYMBOL ACCUMULATOR," Ser. No. 10/071,441; "GAMING DEVICE WITH SIGNIFIED SYMBOLS," Ser. No. 09/990,484; "GAMING DEVICE HAVING DIFFERENT SETS OF PRIMARY AND SECONDARY REEL SYMBOLS," Ser. No. 10/098,691; "GAMING DEVICE HAVING A BONUS SCHEME WITH MULTIPLE SELECTION GROUPS," Ser. No. 10/195,292; and "GAMING DEVICE HAVING A BONUS SCHEME WITH MULTIPLE SELECTION GROUPS," Ser. No. 10/243,047.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device providing a primary game with an outcome that is employed in a bonus or secondary game.

BACKGROUND OF THE INVENTION

Base or primary gaming devices such as slot machines, video poker machines, blackjack machines and keno machines are well-known. Bonus or secondary games initiated as a result of an outcome of these primary games are also well known. Typically, the player's performance in the primary game does not affect the player's performance in the secondary game. That is, besides triggering the bonus game, the base game is normally different than the bonus game, and the two games operate independent of each other.

One known exception to this is disclosed in U.S. Pat. No. 6,190,255 B1, which discloses a "bonus resource" that a player may obtain during the base game. The player can thereafter apply the bonus resource in the bonus game to override an event that would otherwise end the bonus round. In another example, U.S. Pat. No. 6,155,925 discloses a bonus game having a payout percentage that varies with the amount of the player's base game wager.

In a further example, U.S. Pat. No. 6,186,894 B1 discloses a primary and a secondary game that both include slot machine reels and symbols. The number of paylines that the player plays in the base or main game determines the number of chances that the player has in the secondary or bonus game. In another embodiment of this patent, symbol combinations generated by the main game determine the number of chances that the player has in the secondary or bonus game.

While these known games allow a base component to affect the bonus game, the interaction between the secondary or bonus game and the base game outcomes is limited. A need therefore exists to provide a bonus game that more closely interacts with the base game. Further, slot machines and video poker machines make up the majority of existing gaming devices. Needless to say, both have become very popular. With the continuing demand for more entertaining and exciting gaming devices, a need exists to provide new types of games, such as a game having elements of both slot and poker.

SUMMARY OF THE INVENTION

The present invention provides a gaming device having a primary or base game that is adapted to generate a bonus or secondary game. The primary or base game includes any game having the ability to randomly generate symbols, such as a slot, poker, keno or black jack game. In one preferred embodiment, the primary game is slot. The slot game has a plurality of reels each having a plurality of symbols. When the player spins the reels, each reel stops and a number of symbols are displayed to the player. Each symbol is either a bonus triggering symbol or a non-bonus triggering symbol.

If the game randomly displays a predetermined number of bonus triggering symbols, the game thereafter displays or provides the bonus game of the present invention. In different embodiments, the game counts every bonus triggering symbol displayed along an active payline, along any payline, along a plurality of active paylines, along a plurality of paylines or in any position on the screen or display device. In one preferred embodiment, the game counts every bonus triggering symbol displayed on the screen, i.e., in a scatter pay arrangement.

In one embodiment, the display of four or five bonus triggering symbols triggers the bonus round, however, the game may be adapted for different numbers. In an embodiment, the game generates a bonus symbol for each bonus triggering symbol, so that when the game generates four bonus triggering symbols, it then generates four bonus symbols, etc. In one preferred embodiment, each bonus triggering symbol animates or morphs into a bonus symbol.

The game stores a number of different bonus symbols, each of which preferably relate to a theme of the present invention. In one preferred embodiment, the theme of the game is motorcycle daredevil jumping and the bonus symbols are x-rays of different broken bones of the rider. The number of different symbols may be adapted to provide different winning probabilities and in one preferred embodiment, the number of different bonus symbols is five or the largest number of bonus symbols that the game may generate for the player.

The game provides an award based on the combinations that the different bonus symbols form. In one preferred embodiment, the game provides an award for generating symbols "of a kind," i.e., two symbols of a kind, three symbols of a kind, two pair, full house, etc. In this respect, the preferred embodiment resembles a poker game. Since the game is a bonus game, it preferably provides a small award or consolation prize for generating all different symbols or no symbols of a kind. In one embodiment, the bonus game displays a paytable that is preferably adapted for the number of bonus symbols that the player achieves. That is, the bonus game displays a paytable having a payout for generating five symbols of a kind when the player achieves five bonus triggering symbols and thus five bonus symbols, but not when the player only generates four bonus symbols.

Besides the "of a kind" combinations, the game may be adapted to use other combinations, such as adding numbers generated by the bonus symbols and subtracting a threshold number to determine the player's award. When the main portion of the bonus game has been completed, the game optionally provides the player with an opportunity to increase or enhance the player's award.

To increase the player's award, the game contemplates using any sort of random generation device such as a spinning reel or wheel, or in one preferred embodiment, masking one or more award modifiers or multipliers behind the bonus symbols and enabling the player to select one or more symbols. If the player selects a lucky symbol, the game enhances or increases the award. The game then preferably reveals each bonus symbol to show what, if anything, the game has masked.

It is therefore an advantage of the present invention to provide a gaming device having a primary game with a bonus triggering event that affects the player's outcome in a bonus game.

Another advantage of the present invention is to provide a gaming device having a primary game that generates a number of bonus triggering symbols, wherein the number of bonus triggering symbols affects the number of bonus symbols that the player achieves in the bonus game.

A further advantage of the present invention is to provide a bonus game having a number of symbols and a paytable that awards the player for achieving symbols "of a kind."

Yet another advantage of the present invention is to provide a gaming device having elements of both slot and poker.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
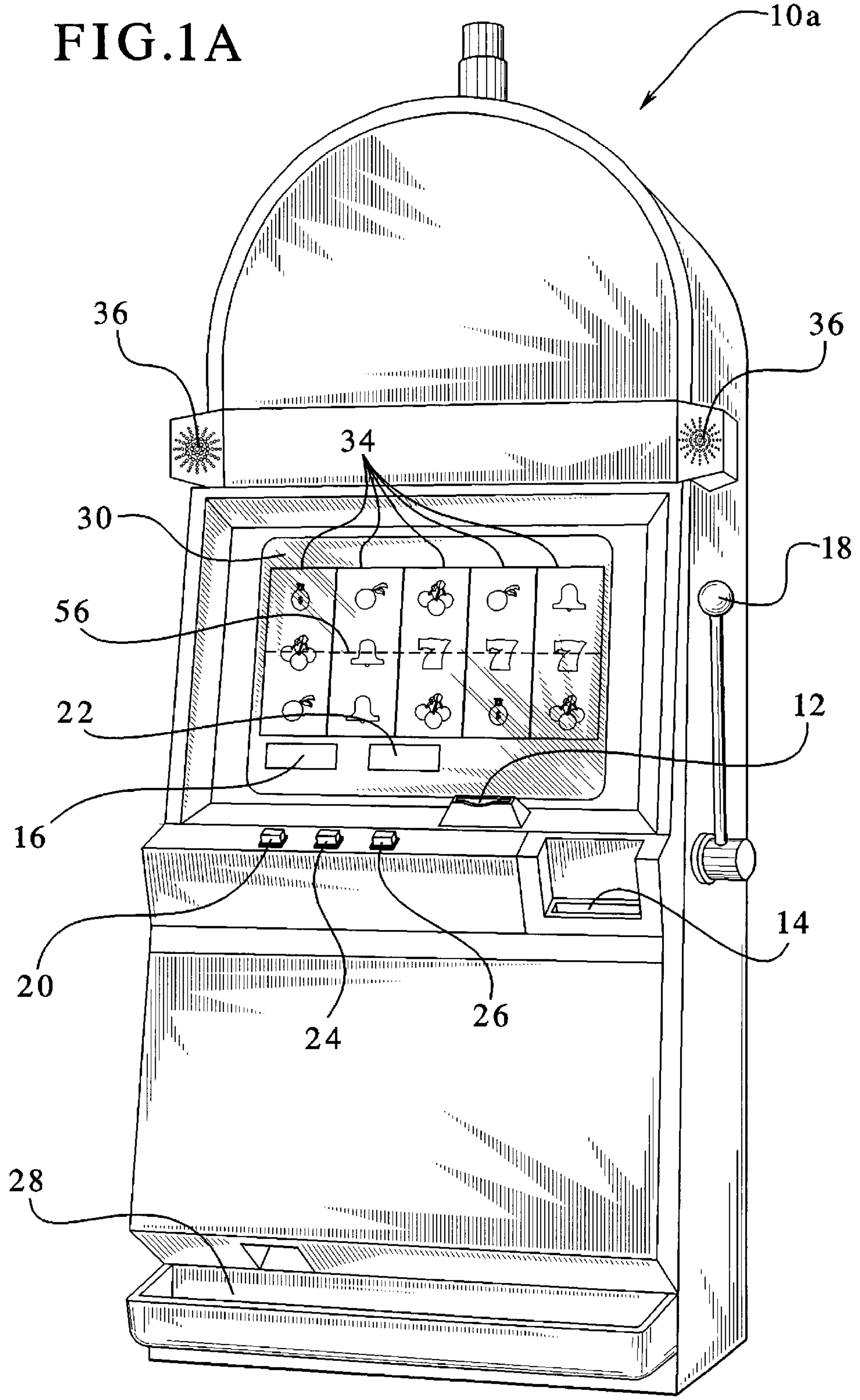
FIGS. 1A and 1B are perspective views of alternative embodiments of the gaming device of the present invention.
Figure 1B:
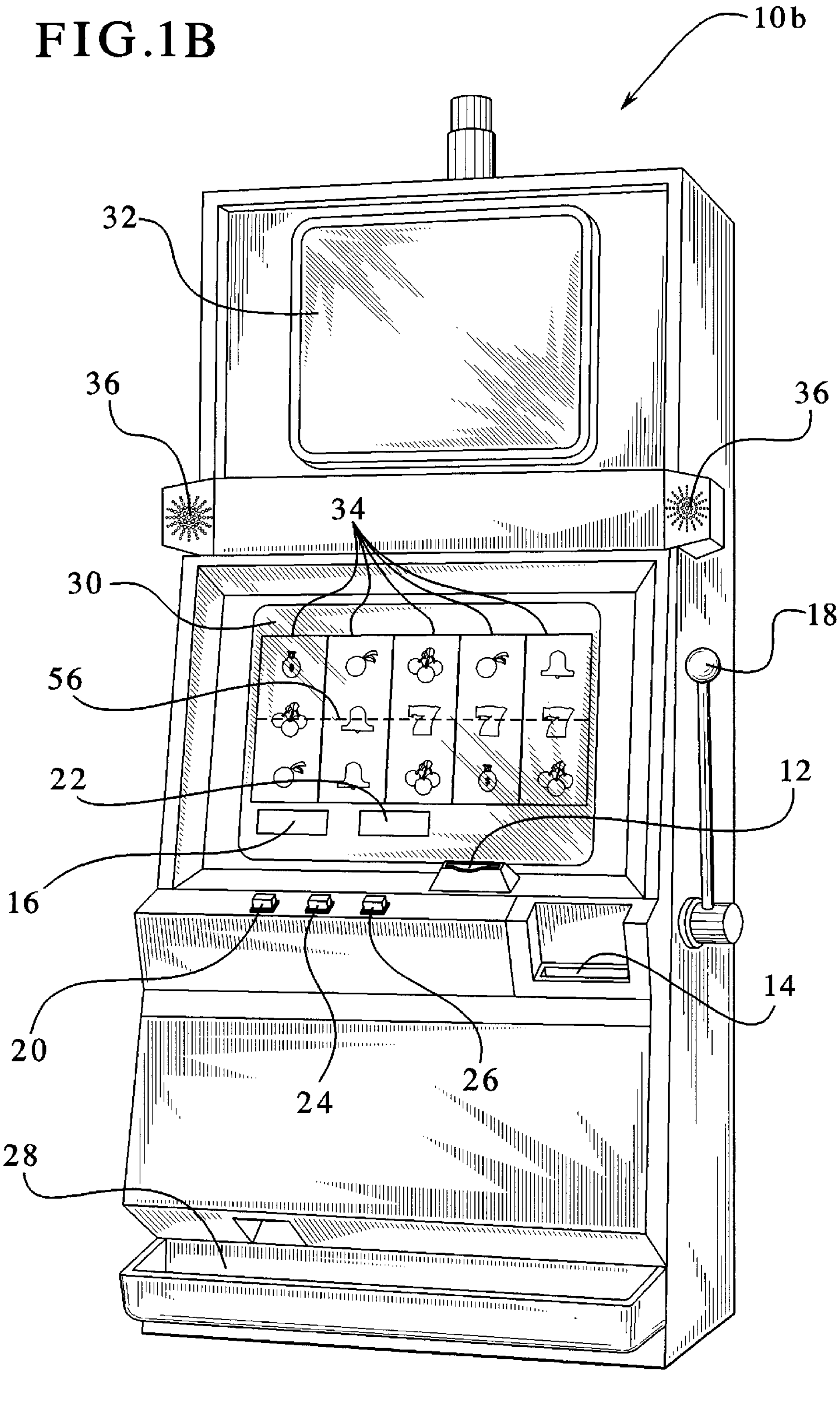

Referring now to the drawings, and in particular to FIGS. 1A and 1B, gaming device 10*a* and gaming device 10*b* illustrate two possible cabinet styles and display arrangements and are collectively referred to herein as gaming device 10. The present invention includes the game (described below) being a stand alone game or a bonus or secondary game that coordinates with a base game. When the game of the present invention is a bonus game, gaming device 10 in one base game is a slot machine having the controls, displays and features of a conventional slot machine, wherein the player operates the gaming device while standing or sitting. Gaming device 10 also includes being a pub-style or table-top game (not shown), which a player operates while sitting.

The base games of the gaming device 10 include slot, poker, blackjack or keno, among others. The gaming device 10 also embodies any bonus triggering events, bonus games as well as any progressive game coordinating with these base games. The symbols and indicia used for any of the base, bonus and progressive games include mechanical, electrical or video symbols and indicia.

In a stand alone or a bonus embodiment, the gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. At any time during the game, a player may "cash out" by pushing a cash out button 26 to receive coins or tokens in the coin payout tray 28 or other forms of payment, such as an amount printed on a ticket or credited to a credit card, debit card or smart card. Well known ticket printing and card reading machines (not illustrated) are commercially available.

Gaming device 10 also includes one or more display devices. The embodiment shown in FIG. 1A includes a central display device 30, and the alternative embodiment shown in FIG. 1B includes a central display device 30 as well as an upper display device 32. The display devices display any visual representation or exhibition, including but not limited to movement of physical objects such as mechanical reels and wheels, dynamic lighting and video images. The display device includes any viewing surface such as glass, a video monitor or screen, a liquid crystal display or any other static or dynamic display mechanism. In a video poker, blackjack or other card gaming machine embodiment, the display device includes displaying one or more cards. In a keno embodiment, the display device includes displaying numbers.

The slot machine base game of gaming device 10 preferably displays a plurality of reels 34, preferably three to five reels 34, in mechanical or video form on one or more of the display devices. Each reel 34 displays a plurality of indicia such as bells, hearts, fruits, numbers, letters, bars or other images which preferably correspond to a theme associated with the gaming device 10. Typically, the display device displays three symbols of each reel, although the display device may be adapted to display any amount of symbols per reel. If the reels 34 are in video form, the display device displaying the video reels 34 is preferably a video monitor. Each base game is also adaptable to include speakers 36 for making sounds or playing music.

Figure 2:
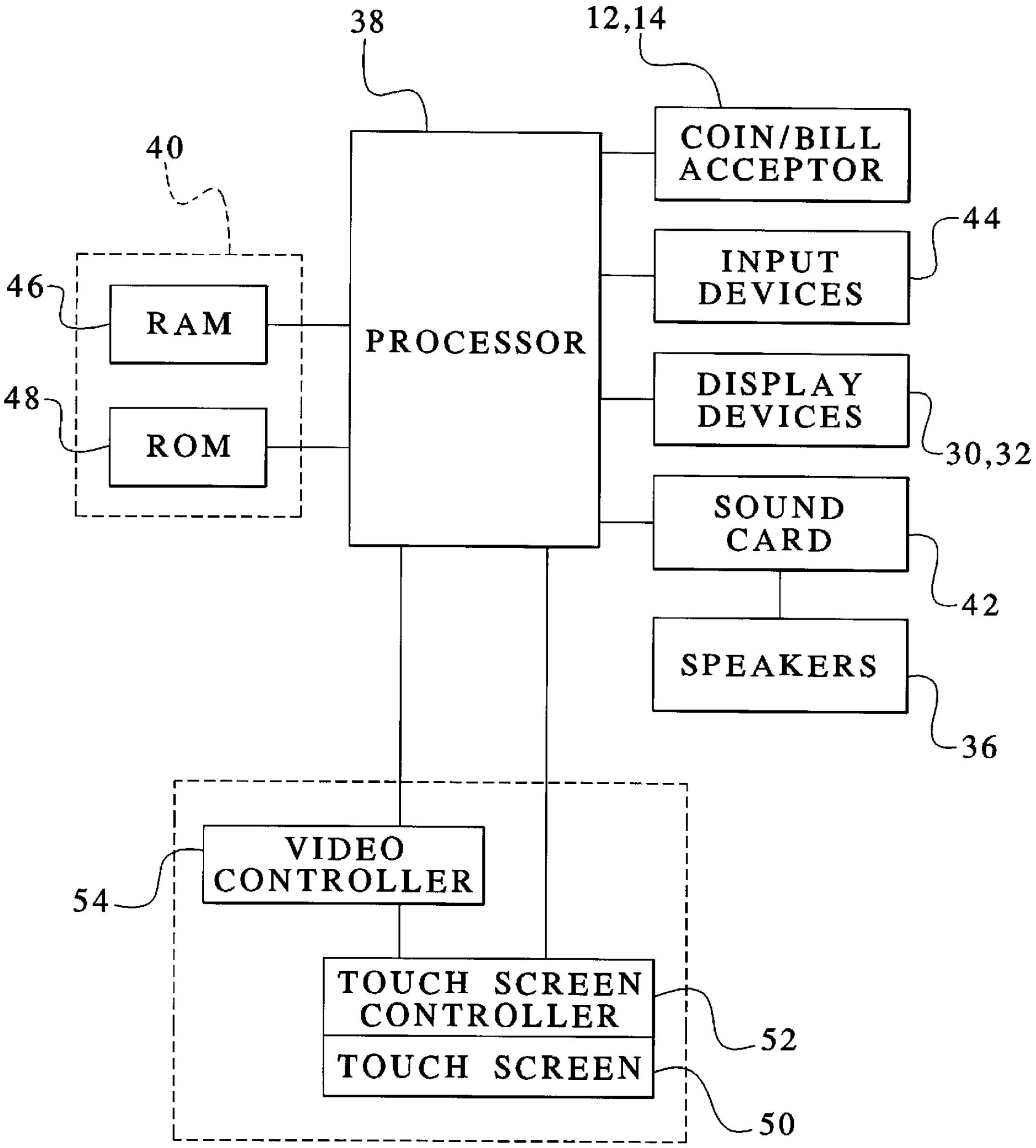
FIG. 2 is a schematic block diagram of the electronic configuration of one embodiment of the gaming device of the present invention.

Referring now to FIG. 2, a general electronic configuration of the gaming device 10 for the stand alone and bonus embodiments described above preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 includes random access memory (RAM) 46 for storing event data or other data generated or used during a particular game. The memory device 40 also includes read only memory (ROM) 48 for storing program code, which controls the gaming device 10 so that it plays a particular game in accordance with applicable game rules and pay tables.

As illustrated in FIG. 2, the player preferably uses the input devices 44 to input signals into gaming device 10. In the slot machine base game, the input devices 44 include the pull arm 18, play button 20, the bet one button 24 and the cash out button 26. A touch screen 50 and touch screen controller 52 are connected to a video controller 54 and processor 38. The terms "computer" or "controller" are used herein to refer collectively to the processor 38, the memory device 40, the sound card 42, the touch screen controller and the video controller 54.

In certain instances, it is preferable to use a touch screen 50 and an associated touch screen controller 52 instead of a conventional video monitor display device. The touch screen enables a player to input decisions into the gaming device 10 by sending a discrete signal based on the area of the touch screen 50 that the player touches or presses. As further illustrated in FIG. 2, the processor 38 connects to the coin slot 12 or payment acceptor 14, whereby the processor 38 requires a player to deposit a certain amount of money in to start the game.

It should be appreciated that although a processor 38 and memory device 40 are preferable implementations of the present invention, the present invention also includes being implemented via one or more application-specific integrated circuits (ASIC's), one or more hard-wired devices, or one or more mechanical devices (collectively referred to herein as a "processor"). Furthermore, although the processor 38 and memory device 40 preferably reside in each gaming device 10 unit, the present invention includes providing some or all of their functions at a central location such as a network server for communication to a playing station such as over a local area network (LAN), wide area network (WAN), Internet connection, microwave link, and the like.

With reference to the slot machine base game of FIGS. 1A and 1B, to operate the gaming device 10, the player inserts the appropriate amount of tokens or money in the coin slot 12 or the payment acceptor 14 and then pulls the arm 18 or pushes the play button 20. The reels 34 then begin to spin. Eventually, the reels 34 come to a stop. As long as the player has credits remaining, the player can spin the reels 34 again. Depending upon where the reels 34 stop, the player may or may not win additional credits.

In addition to winning base game credits, the gaming device 10, including any of the base games disclosed above, also includes bonus games that give players the opportunity to win credits. The gaming device 10 preferably employs a video-based display device 30 or 32 for the bonus games. The bonus games include a program that automatically begins when the player achieves a qualifying condition in the base game.

In the slot machine embodiment, the qualifying condition includes a particular symbol or symbol combination generated on a display device. As illustrated in the five reel slot game shown in FIGS. 1A and 1B, the qualifying condition includes the number seven appearing on, e.g., three adjacent reels 34 along a payline 56. It should be appreciated that the present invention includes one or more paylines, such as payline 56, wherein the paylines can be horizontal, diagonal or any combination thereof. Typical slot machines include one, three, five, nine or fifteen paylines 56, wherein nine paylines is very common.

An alternative scatter pay qualifying condition includes the number seven appearing on, e.g., three adjacent reels 34 but not necessarily along a payline 56, appearing on any different set of reels 34 three times or appearing anywhere on the display device the necessary number of times. It is thus easier to achieve a bonus game qualifying condition in a scatter pay than it is when the condition must appear on a payline 56. It is also easier to achieve a bonus game qualifying condition when the condition is able to appear anywhere on a payline 56 than it is when the condition must appear on adjacent reels of a payline 56.

Primary Game

Figure 3A:
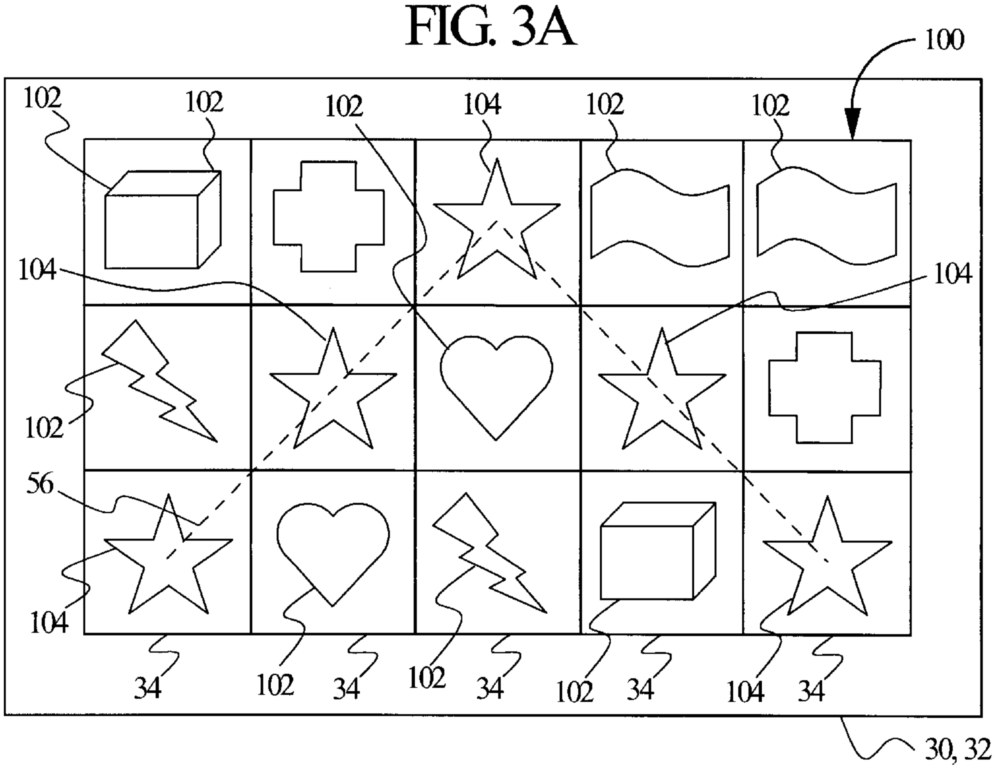
FIGS. 3A and 3B are front elevation views of one embodiment of the primary game illustrating five and four bonus triggering symbols of the present invention, respectively, which are generated among various non-bonus triggering symbols.
Figure 3B:
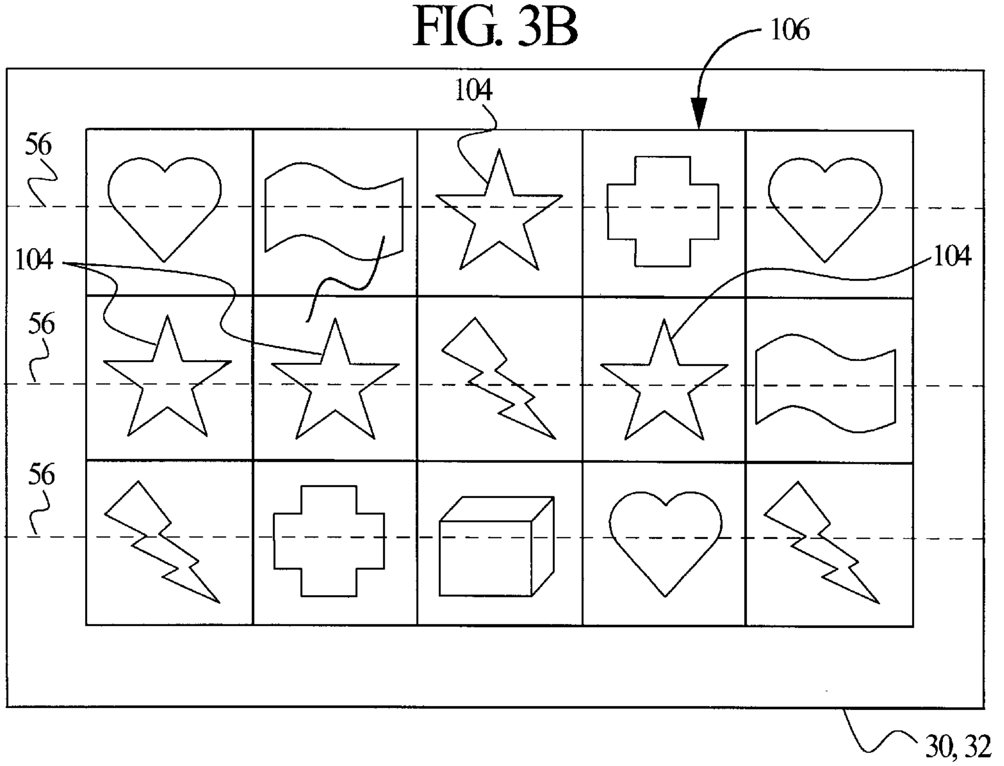

Referring now to FIGS. 3A and 3B, one implementation of the preferred primary or base game of slot is illustrated on one of the display devices 30 or 32. The primary slot game includes the plurality of reels 34 having a plurality of symbols, whereby the game randomly generates a display of symbols or primary game symbols upon the player's input via the bet, spin or play button 20 or pull arm 18, as described above. Certain winning symbols or winning symbol combinations yield base or primary game awards, as is well known. Certain symbols on the reels 34 are bonus initiating or bonus triggering symbols. The bonus triggering symbols are also available to yield base or primary game awards alone or in combination with non-bonus triggering symbols.

The game of the present invention requires a predefined number of bonus triggering symbols to appear on the reels 34 to trigger the bonus game. Besides triggering the bonus game, the number of bonus triggering symbols also affects the outcome of the bonus game as described in detail below.

Referring now to one embodiment of the primary or base game illustrated in FIG. 3A, after spinning the reels 34, the base game provides a first screen 100 on one of the display devices 30 or 32. Each reel 34 of the screen 100 displays a plurality of symbols, including standard base game symbols 102 ("standard symbols") and bonus triggering symbols 104 ("triggering symbols").

In this general implementation of the primary game, the standard symbols 102 include the squares, plus signs, lightening bolts, hearts and flags. The triggering symbols 104 are stars. It should be appreciated that the standard symbols 102 and triggering symbols 104 preferably correspond to a theme associated with the gaming device 10. In one preferred embodiment of the gaming device 10, the theme includes a motorcycle daredevil, wherein the standard symbols 102 correspond to motorcycles, motorcycle riding and daredevil jumping, while the triggering symbols 104 include an x-ray symbol.

The game mathematics determine the placement of the triggering symbols 104 on the reels 34 as well as the percentage of triggering symbols 104 compared with the standard symbols 102. Gaming device 10 preferably includes at least two reels and may therefore display a single standard symbol 102 and a single bonus triggering symbol 104. Each reel 34 preferably includes at least one triggering symbol 104. The reels 34 in one embodiment each include a total of 45 symbols. Since the reels 34 are preferably simulated, however, the game implementor may adapt the reels 34 to include any total number of symbols. If in mechanical form, the reels 34 are constrained by space and are therefore typically limited to a total of 22 symbols.

Game mathematicians can manipulate the present invention to produce any desired bonus game triggering frequency. Typically, the triggering frequency is driven by the desired overall payout percentage of the gaming device 10 as well as the size or value of the bonus awards. For a given payout percentage, the game may be adapted to trigger the bonus game relatively frequently, but payout relatively small bonus awards and vice versa. The likelihood of success in the bonus game is also a factor of the overall payout percentage of the game.

The primary game includes requiring a predefined number of symbols to appear: (i) on a payline 56; (ii) on an active payline (i.e., a payline wagered on by the player); (iii) adjacently on a payline 56 or paylines 56; (iv) adjacently on an active payline or active paylines; (v) adjacently on two or more reels 34; (vi) on any predefined combination of reels 34; and (vii) anywhere on the display device 30 or 32 (i.e., scattered). The screen 100 of FIG. 3A illustrates five triggering symbols 104 appearing along a payline 56. The screen 106 of FIG. 3B illustrates four triggering symbols 104 appearing in scattered form, i.e., not along any payline 56 (FIG. 3B shown with only three paylines 56).

Although FIGS. 3A and 3B show each triggering symbol 104 having the same indicia, it should be appreciated that the triggering symbols 104 may be adapted to have different indicia without affecting the primary or bonus games of the present invention. For simplicity however, the player more readily recognizes bonus triggering symbols 104 having like indicia rather than such symbols having different indicia.

In one preferred embodiment, the reels 34 each include a triggering symbol 104, and the game requires that the primary game generate four or five symbols in a scatter pay arrangement, i.e., anywhere on the display 30 or 32. The game is adaptable to require less than four symbols including only one symbol 104, but as described below, three or fewer symbols creates limitations in the preferred bonus game. The game is also adaptable to require more than five symbols, however, on a preferred five reel slot machine, at least one reel 34 would have to produce two triggering symbols 104. To produce two triggering symbols 104 on the same reel 34 would require back to back triggering symbols 104 or triggering symbols 104 spaced apart by one standard symbol 102, both of which are undesirable in generating desirable game math as is well known to those of skill in the art.

Transition from Primary to Bonus Game

It should be understood that in the preferred embodiment of the primary or base game of the present invention, four or five triggering symbols scattered anywhere on the display device triggers the bonus game of the present invention. When this condition occurs, or when any of the other above alternative conditions occur, the display device 30 or 32 preferably provides a visual sequence or display sequence such as visually modifying the primary game display into a bonus game display including changing the bonus triggering symbols into bonus symbols. The transition from the primary game to the bonus game may also be adapted to include an accompanying audio production from the speakers 36 illustrated in FIGS. 1A and 1B.

Figure 4A:
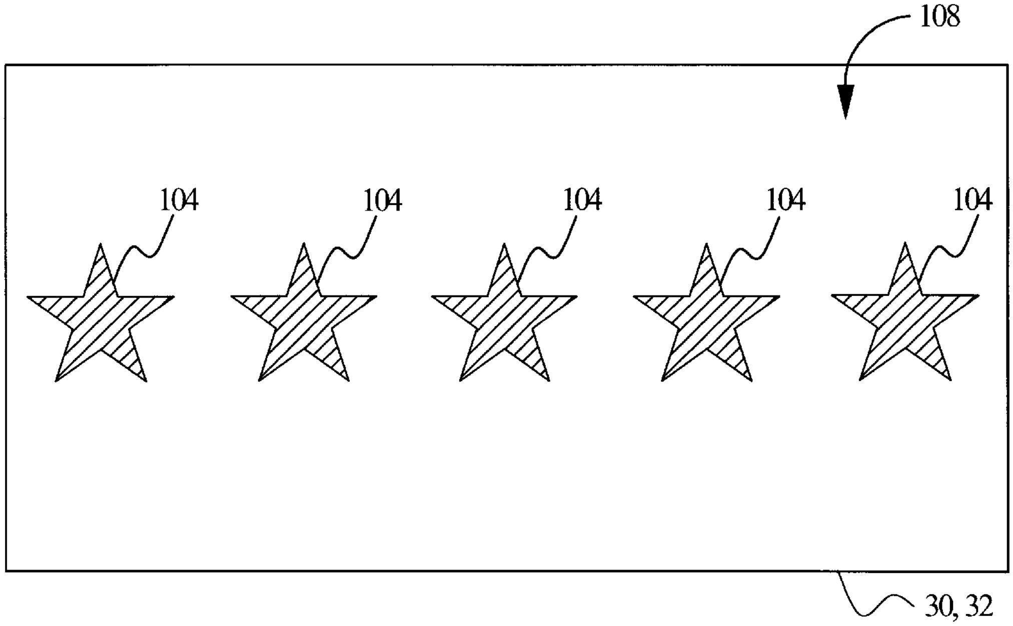
FIGS. 4A and 4B are front elevation views of an embodiment having intermediate screens, wherein the screens align the five and four bonus triggering symbols, respectively, before the bonus symbols of the present invention are generated.
Figure 4B:
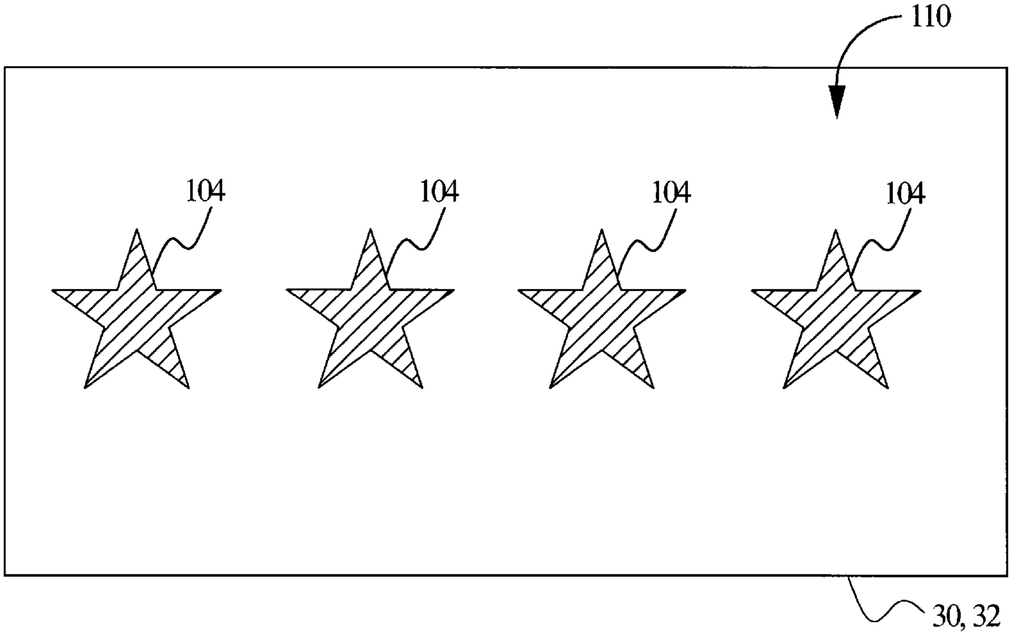

The screen 108 of FIG. 4A illustrates an optional intermediate step in the transition. Assuming the game generates one of the bonus triggering combinations of the screens 100 and 106 of FIGS. 3A and 3B, the transition in one embodiment removes the reels 34 and the standard symbols 102 and aligns the triggering symbols 104 as illustrated by the screen 108 of FIG. 4A and the screen 110 of FIG. 4B. FIGS. 4A and 4B illustrate the alignment of five and four triggering symbols 104, respectively, which would appear if the player enters the bonus game by generating five or four triggering symbols 104 in the base or primary game. Many display variations may be adapted by those skilled in the art. Preferably, however, the transition screens: (i) suitably inform the player that the primary game is temporarily suspended; and (ii) organize and highlight the triggering symbols 104 in such a way that the player understands that the triggering symbols 104 are hereafter cooperating as a unit.

In an embodiment having mechanical reels 34 on one of the display devices 30 or 32, the transition preferably occurs on a separate video display device. In this case, the game may be adapted to dim the back lights of the mechanical reels 34 and suitably animate the transition screen so as to direct the player to the transition and thus to the bonus game.

Figure 5A:
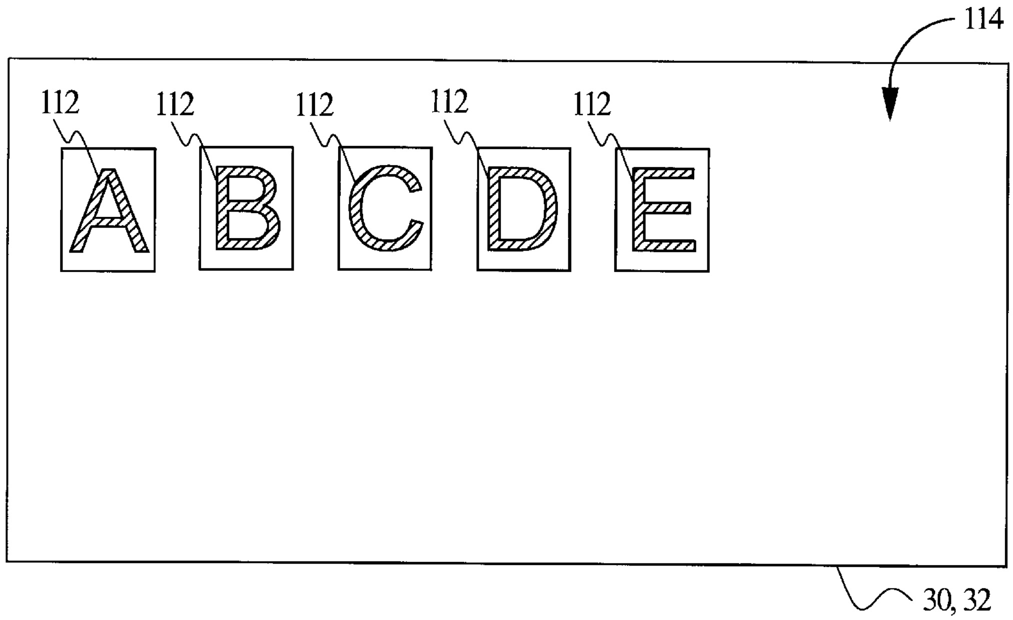
FIGS. 5A and 5B are front elevation views of one embodiment of a bonus screen illustrating five and four bonus symbols of the present invention, respectively.
Figure 5B:
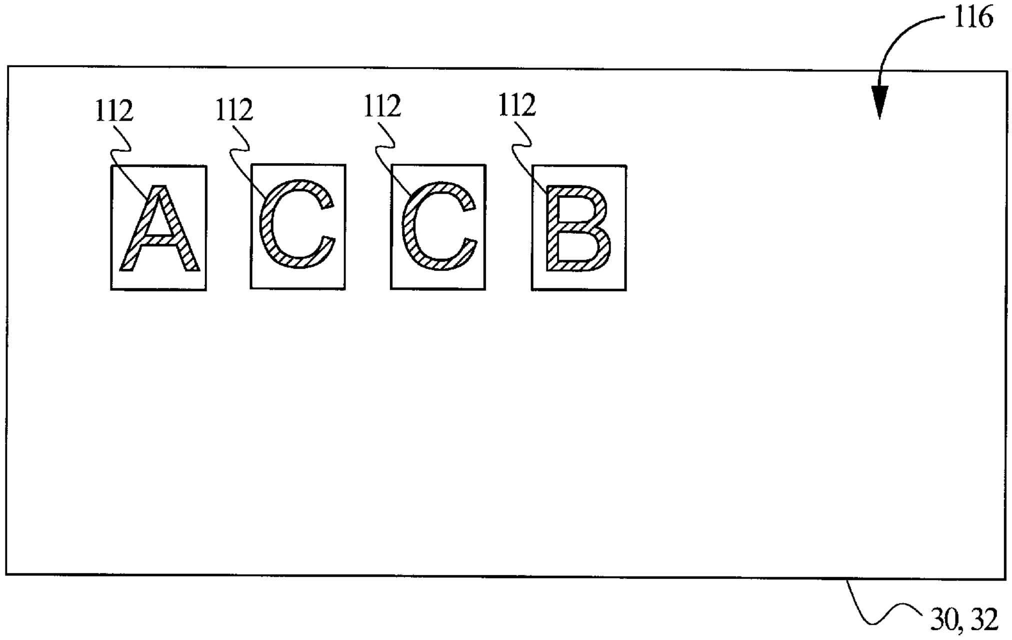

Although not illustrated, the transition screens 108 and 110 preferably animate, morph or otherwise change the triggering symbols 104 into a plurality of randomly generated bonus symbols 112, which are illustrated in FIGS. 5A and 5B. The animation or morphing simulates movement so that it appears that the bonus triggering symbols 104 vibrate, shake, rotate, flip over, move upwards, downwards, or from side to side, bend, transform into different shapes or sizes, separate into different parts, expand or contract, change colors, shades or patterns, illuminate, melt, fade, or otherwise have dynamic visual characteristics. The animation or morphing includes different visual media such as cartoons, motion pictures or video. The game also preferably provides suitable audio to accompany the animation or morph.

Bonus Game

Referring now to FIGS. 5A and 5B, the transition screens 108 and 110 of FIGS. 4A and 4B, having five and four triggering symbols 104, respectively, are illustrated as having transitioned, so that the bonus symbols 112 have replaced the triggering symbols 104 in the screens 114 and 116, respectively. The screen 114 displays the bonus symbols 112 "A" through "E." The screen 116 displays the bonus symbols 112 "A" through "C." The processor of the gaming device employs any suitable random generation routine stored in memory 40 (FIG. 2), to generate the bonus symbols 112 from a set or range of bonus symbols 112. The random generation and display of bonus symbols 112 from a set of bonus symbols 112 is in one preferred embodiment non-weighted and may alternatively employ a weighted distribution.

In the illustrated embodiment, the number of bonus symbols 112 that the game provides and displays equals the number of triggering symbols 104 that triggered the transformation. That is, in one preferred embodiment, each bonus triggering symbol 104 changes into or leads to the creation of a single bonus symbol 112. There is a one to one relationship between the number of triggering symbols 104 and the number of bonus symbols 102.

In another embodiment, the number of bonus symbols 112 is related but not necessarily equal to the generated number of bonus triggering symbols 104. For instance, the game may be adapted to add or subtract a number of bonus symbols 112, such as one less, one more or two more symbols 112 to the number of bonus triggering symbols 104. In another implementation, the game may be adapted to generate a number of bonus symbols that is a multiple of the number of bonus triggering symbols 104, such as 0.5, 0.75, 2 or 3 times the number of bonus triggering symbols 104. The game may be adapted to apply any suitable different method or different algorithm to the number of bonus triggering symbols 104.

In a further implementation, the game does not apply an algorithm or method in calculating the number of bonus symbols 112 from the number of bonus triggering symbols 104; rather, the game randomly generates a number of bonus symbols 112 regardless of the number of bonus triggering symbols 104. In yet another implementation, the game randomly generates the number of bonus symbols 112 and weights the random generation in favor of providing more bonus symbols 112 as the number of bonus triggering symbols 104 increases. In this latter embodiment, the game may be adapted to employ any suitable weight distribution.

The screen 114 of FIG. 5A illustrates a range of five different bonus symbols; namely, the bonus symbols 112 "A" through "E." As seen below, the range of different bonus symbols is important for determining the probability and payouts for various winning combinations of the bonus symbols 112. In one preferred embodiment, the range of different bonus symbols 112 equals the largest possible number of triggering symbols 104. That is, in the preferred embodiment four or five bonus triggering symbols triggers the bonus game, so that the range of different bonus symbols 112 is therefore five.

In another embodiment, the range of different bonus symbols 112 depends on, but is not necessarily equal to, the largest number of required bonus triggering symbols 104. For instance, the game in an implementation adds or subtracts to or from the maximum required triggering symbols 104, such as one less, one more or two more symbols. In another implementation, the game generates a range of different bonus symbols 112 that is a multiple of the largest number of required bonus triggering symbols 104, such as 0.5, 0.75, 2 or 3 times the largest number.

In a further implementation, the range of different bonus symbols 112 equals or depends on a number of required bonus triggering symbols 104, which is not the largest number. That is, in the preferred embodiment, four or five bonus triggering symbols 104 triggers the bonus game. In this alternative embodiment, the range of symbols is four.

In yet another embodiment, the range of different bonus symbols 112 varies depending upon how many bonus triggering symbols 104 trigger the bonus game of the present invention. That is, in the preferred embodiment four or five bonus triggering symbols 104 trigger the bonus game. Here the number of different bonus symbols 112 employed is four, if four bonus triggering symbols 104 trigger the bonus game, and five, if five bonus triggering symbols 104 trigger the bonus game. In another implementation, the number of different bonus symbols 112 depends upon but is not necessarily equal to the different number of bonus triggering symbols 104 that triggers the bonus game.

In yet a further alternative embodiment, the range of different bonus symbols 112 may be any predefined or randomly determined number as desired by the game implementors, and does not necessarily need to depend on or relate to a required number of bonus triggering symbols 104. It could relate, for instance, to the type of or other characteristic of the bonus triggering symbols or other occurrence in the base game The range of different bonus symbols may, for example, be predefined to be six, eight, ten, fifteen, twenty, etc. The range of different bonus symbols may, for example, be randomly chosen from six, eight, ten, fifteen or twenty different bonus symbols 112. This random generation is alternatively weighted.

In one embodiment, the indicia of the different bonus symbols 112 relate to the theme of motorcycle daredevil riding and in particular to stunt jumps. The bonus symbols include x-ray pictures of a plurality of different broken bones. For example, different bonus symbols are x-rays of a broken or fractured arm bone, leg bone, thigh bone, hand, foot or skull, etc. In this embodiment which includes a maximum bonus triggering requirement of five bonus triggering symbols 104, the range of different bonus symbols 112 include five x-rays of different broken bones.

Figure 6A:
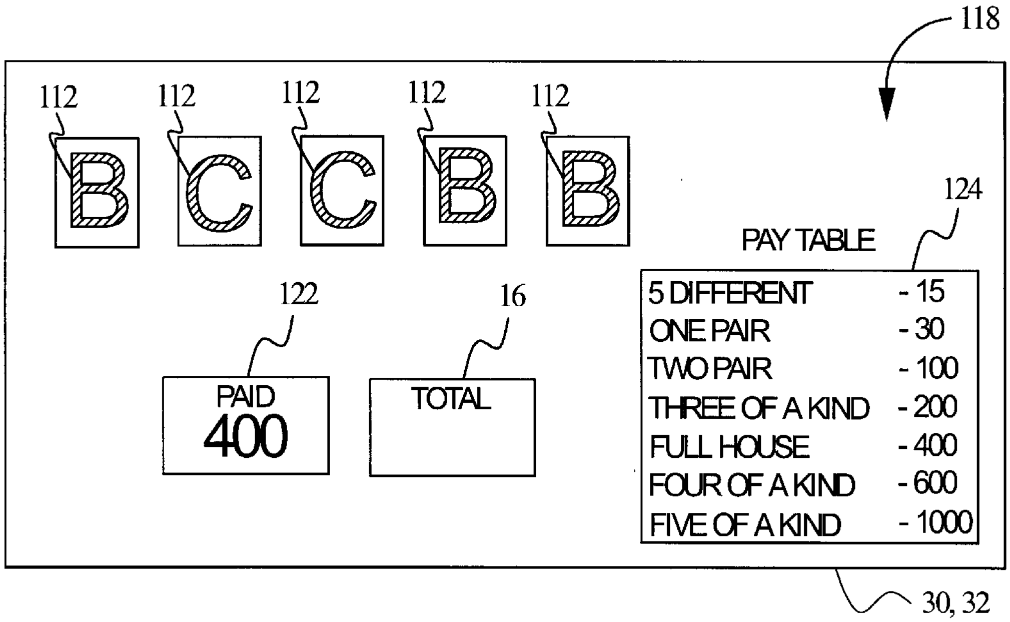
FIGS. 6A and 6B are front elevation views of a bonus screen illustrating paytables of the present invention having one possible set of winning combinations of five and four bonus symbols, respectively.
Figure 6B:
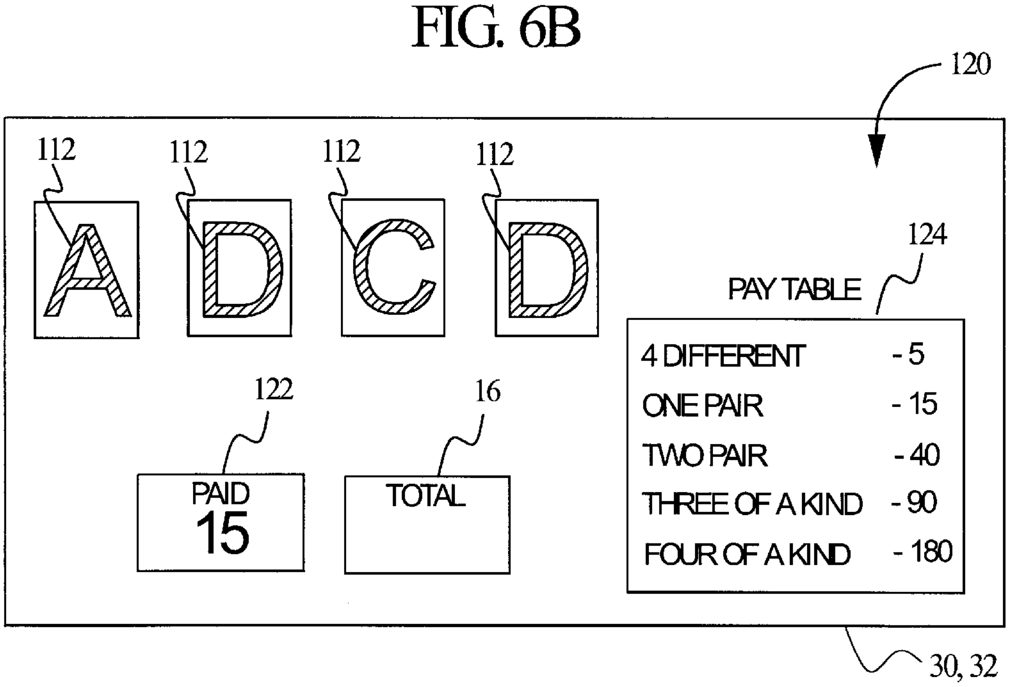

Referring now to the screens 118 and 120 of FIGS. 6A and 6B, respectively, the award generation feature of the present invention is illustrated. The screen 118 displays five generated bonus symbols 112. The screen 120 displays four generated bonus symbols 112. Each of the screens 118 and 120 also displays a paid display 122 and a simulated credit display 16. The paid display 122 displays a number of credits generated by the bonus game of the present invention. The total credit display 16 displays the player's total awards or credits, which includes the additional amount generated by the bonus game. The awards of the primary and secondary games of the present invention include game credits and game credit multipliers. The awards may be adapted to represent other items of value, such as a number of picks from a prize pool.

Each of the screens 118 and 120 also displays a bonus paytable 124. For purposes of illustration, the paytables 124 are displayed along with the bonus symbols 112. The paytables 124 may be adapted to be displayed on a different screen. For instance, in the embodiment of FIG. 1B, the game includes displaying the bonus symbols 112 on the central display device 30 and displaying the appropriate bonus paytable 124 on the upper display device 32, or vice versa. The bonus paytable 124 may also be displayed as part of the main paytable, which includes payouts for winning combinations of the non-bonus triggering symbols 102 and the bonus triggering symbols 104 of the base game. One method and apparatus for selectively accessing a desired portion of a paytable incorporated herein by references is disclosed in U.S. patent application Ser. No. 09/680,349, entitled "GAMING DEVICE PROVIDING TOUCH ACTIVATED SYMBOL INFORMATION," filed on Oct. 5, 2000 and assigned to the assignee of the present application.

The paytables 124 are preferably modified or selectively recalled for the particular number of bonus symbols 112 that the bonus game generates. That is, the paytable 124 of the screen 118 of FIG. 6A includes additional payout combinations for the five displayed bonus symbols 112 that are not possible in the screen 120, which only displays four bonus symbols 112. The bonus game preferably only displays the relevant payout combinations, however, the bonus game may alternatively maintain a single paytable 124, having each possible winning combination, which the game displays regardless of the number of generated bonus symbols 112.

The paytable 124 of the screen 118 includes a plurality of different winning combinations. In the illustrated payout combination regime, if the game generates five different bonus symbols 112, the game provides an award of fifteen. One pair or two bonus symbols 112 of a kind yields an award of thirty. Two pairs of bonus symbols 112 yields an award of one hundred. Three bonus symbols 112 of a kind yields an award of two hundred. A full house or three bonus symbols 112 of a kind in combination with two bonus symbols 112 of a kind yields an award of four hundred. Four bonus symbols of a kind and five bonus symbols 112 of a kind yield awards of six hundred and one thousand, respectively. The award distribution may be adapted as desired without changing the scope of the claimed invention, however, the lower the probability of the combination, the higher the payout.

It should be appreciated that increasing the range of different bonus symbols lowers the likelihood of achieving a winning combination. As a bonus game, the game preferably provides some award regardless of which bonus symbols 112 the game generates. Therefore, the game provides an award for generating five different bonus symbols 112.

The paytable 124 of the screen 120 displays the relevant winning combinations for four bonus symbols 112; namely: (i) an award of five for four different bonus symbols 112; (ii) an award of fifteen for one pair of bonus symbols 112; (iii) an award of forty for two bonus symbols 112 of a kind; (iv) an award of ninety for three bonus symbols 112 of a kind; and (v) an award of one hundred eighty for four bonus symbols of a kind. The awards, as before, increase as the combination probabilities decrease. The game does not have to use letters and can instead use numbers or any indicia or simply use different colors.

Comparing the paytables 124 of the screen 118 versus the screen 120, the game, as illustrated, rewards the player for generating five bonus symbols 112 by providing a higher award (e.g., one hundred versus forty) for the same winning combination (e.g., two pair) after generating five bonus symbols 112 versus generating four bonus symbols 112.

In the screen 118, gaming device 10 in one embodiment randomly selects from, e.g., a range of five different bonus symbols 112 for each of the five displayed bonus symbols 112. In the screen 120, the gaming device 10 in one embodiment randomly selects from a range of at least four different bonus symbols 112, for each of the four displayed bonus symbols 112. In one preferred embodiment for the screen 120, gaming device 10 randomly selects from the same range of five symbols 112 used in connection with the screen 118.

Since, the games of the illustrated screens 118 and 120 provide awards for combinations rather than for particular symbols, the games may be adapted to use different symbols in different games. For example, the game can select from the symbols "F" through "J" in another game.

The game in an embodiment is equally likely to pick any of the different symbols for any of the bonus symbols 112. The paytables 124 accordingly provide the same award for a pair of "A," "A" symbols as they do for a pair of "B," "B" symbols. That is, the combinations of the paytables 124 apply equally to each different symbol. The game alternatively weights different symbols and applies the combinations unequally. The paytables 124 would then reflect a different award for the different combinations, e.g., one award for a pair of "A," "A" symbols and another award for a pair of "B," "B" symbols.

The game contemplates using other combinations besides the "of a kind" type combinations illustrated on the screens 118 and 120. For example, in an embodiment, the game generates a number of bonus symbols 112 having lettered indicia and awards the player for each different English word that is adaptable from the generated letters. In another example, the game generates a number of bonus symbols 112 having numbered indicia, adds or multiplies the awards and provides the positive difference between the mathematically combined number and a set point or award threshold. Those skilled in the art can derive other combinations for producing awards from the foregoing description.

Figure 7A:
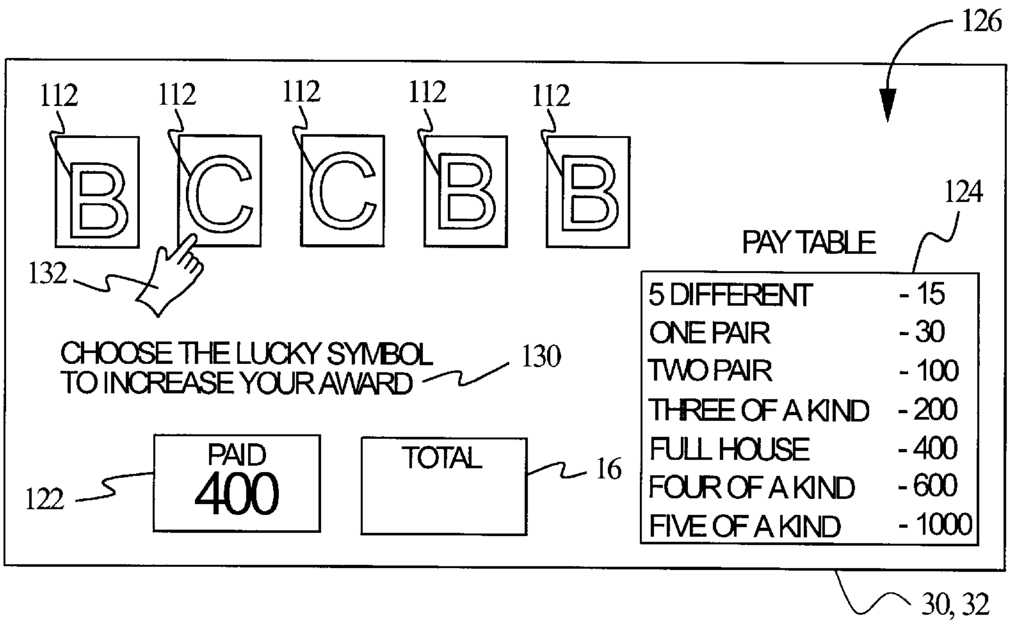
FIGS. 7A and 7B are front elevation views of a bonus screen illustrating an embodiment having the award increase or enhancement feature of the present invention.
Figure 7B:
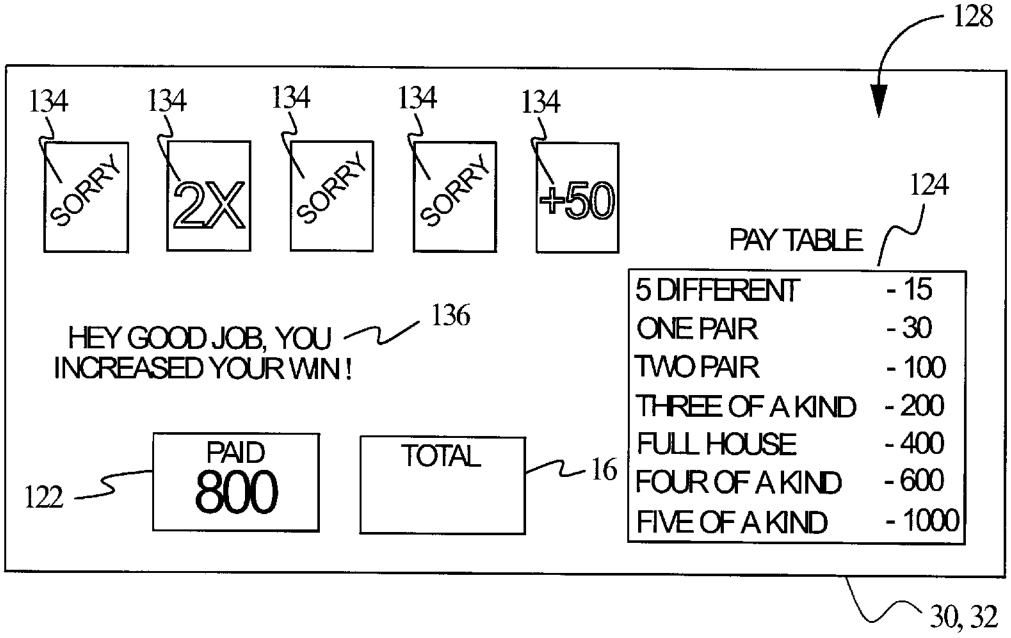

Referring now to the screens 126 and 128 of FIGS. 7A and 7B, respectively, an award enhancement or increase feature of the present invention is illustrated. The screens display five bonus symbols 112, however, the award enhancement or increase feature applies to all embodiments described above. The screens include the paid display 122, the total credit display 16 and the paytable 124, which have the functionality described above. The bonus game does not have to provide, but preferably provides the award enhancement feature.

Referring to the screen 126, and assuming the game generates the bonus symbols 112 having a full house of three "B's" and two "C's," the game awards four hundred credits to the player according to the paytable 124 and as illustrated in the paid display 122. The award enhancement or increase feature thereafter enables the player to select one or more symbols 112 in an attempt to generate an award modifier, such as an award multiplier, or an additional award that the game adds to the generated award.

In a preferred embodiment, the player selects one of the bonus symbols 112, which is a simulated area of the touch screen 50. Other embodiments may be adapted to employ a separate simulated or electromechanical device (not illustrated), such as a separate spinning reel or wheel. In the preferred embodiment, the player is enabled to pick one bonus symbol 112 from the five, wherein each symbol 112 masks whether or not it hides an award increase. The game may be adapted to have any combination or probability of the bonus symbols mask the award increases. The game may also be adapted to enable the player to pick a plurality of different bonus symbols 112 in an attempt to find an award increase.

In the illustrated example, the player 132 picks the "C" symbol 112 in the screen 126. The game unmasks the picked symbol and preferably unmasks each bonus symbol 112, as illustrated in the screen 128 of FIG. 7B. Each revealed symbol is illustrated having a message 134 informing the player whether or not the symbol has masked an award increase. In this example the player has unmasked the symbol which reveals the 2×multiplier, which increases or modifies the player's award to eight hundred as illustrated in the paid display 122. The symbol 112 to the far right masks a message 134 indicating it would have provided an additional award of fifty. The remainder of the symbols mask messages 134 indicating that they would not have modified the player's award. Not every symbol has to be revealed or have an associated message 134. A revealed symbol having no award increase may simply be a blank.

In this implementation, the player has a two in five chance of increasing the originally generated award. Other embodiments, may have different probabilities. This embodiment has a multiplier and an adder, however, other embodiments include all multipliers or all adders. The increasing feature may be adapted to be provided in each bonus game of the present invention, be provided in a predetermined order or sequence of games, e.g., every third, or be randomly generated according to a set or varying percentage of the bonus games. The multipliers or adders may also be adapted to increase the generated awards by any desired percentage.

In one alternative embodiment of the present invention, the bonus symbols are masked or associated with a plurality of selections. The gaming device includes a selector for enabling the player to choose a plurality of the masked bonus symbols or selections. The selector preferably includes a touch screen, and may alternatively include a plurality of mechanical or electromechanical push buttons or indicators or any other suitable device for enabling the player to select the masked bonus symbols or the selections. In this embodiment, the player chooses a number of the selections. When a player chooses a selection, a bonus symbol is revealed by the display device. This provides an interactive feature of the present invention. It should be appreciated that the number of bonus symbols are preferably based on the number of bonus triggering symbols.

To make the game even more exciting and enjoyable for the player, the number of selections could be greater than the number of bonus symbols which the player obtains. The processor randomly associates bonus symbols with the number of selections. The processor and the selector enable the player to select a plurality of those selections. The player does not select all of the selections, and the actual outcome is based on the player's determination instead of a completely random determination by the processor. It should also be appreciated that this game could include additional opportunities, sub-games or sequences which enable the player to obtain one or more additional selections. It should further be appreciated that to obtain additional selections, the game may require that the player put at risk some or all of the award based on the bonus symbols already selected by the player.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device comprising:

a plurality of reels including at least two bonus triggering symbols;

a set of bonus symbols;

at least one award associated with a predefined combination of bonus symbols;

a display device; and a processor which controls the display device and the reels, and upon a generation and display of at least a number of the bonus triggering symbols on the reels, the processor:

(i) generates a number of bonus symbols randomly from the set, wherein the number of bonus symbols is based on the number of bonus triggering symbols which appear on the reels wherein each said bonus triggering symbol causes at least one of said bonus symbols to be generated, (ii) causes the display device to display the generated bonus symbols, and (iii) provides the player the award associated with the predefined combination if the predefined combination of bonus symbols is formed by the generated bonus symbols.

2. The gaming device of claim 1, wherein the reels and bonus symbols appear on the same display device.

3. The gaming device of claim 1, wherein each bonus triggering symbol randomly changes to one of the set of bonus symbols upon the generation of the predefined number of bonus triggering symbols.

4. The gaming device of claim 3, which includes a visual sequence by the display device associated with the change of the bonus triggering symbols to the bonus symbols.

5. The gaming device of claim 1, wherein the predefined number of the bonus triggering symbols must be on an active payline associated with the reels to cause the processor to generate bonus symbols.

6. The gaming device of claim 1, wherein the predefined number of the bonus triggering symbols on the reels must be on adjacent reels.

7. The gaming device of claim 1, wherein the number of generated bonus symbols is different than the number of bonus triggering symbols that appear on the reels.

8. The gaming device of claim 1, wherein the set includes an amount of different bonus symbols equal to an amount of the bonus triggering symbols required to generate the bonus symbols.

9. The gaming device of claim 1, wherein the set includes an amount of different bonus symbols that differs from an amount of the bonus triggering symbols required to generate the bonus symbols.

10. The gaming device of claim 1, which includes a plurality of predefined combinations of bonus symbols including no like bonus symbols, two like bonus symbols, two pairs of like bonus symbols, three like bonus symbols, three like first bonus symbols and two like second bonus symbols, four like bonus symbols and five like bonus symbols.

11. The gaming device of claim 10, which includes an award associated with each said predefined combination.

12. A gaming device comprising:

a plurality of reels including at least two bonus triggering symbols;

a set of bonus symbols;

at least one award associated with a predefined combination of bonus symbols;

a display device; and a processor which controls the display device and the reels, wherein the processor:

(i) generates a number of bonus symbols randomly from the set, said number based on the number of bonus triggering symbols which appear on the reels wherein each said bonus triggering symbol causes at least one of said bonus symbols to be generated, (ii) causes the display device to display the generated bonus symbols, and (iii) provides the player any award associated with the predefined combination formed by the generated bonus symbols.

13. The gaming device of claim 12, which includes an animated sequence on the display device in which at least one bonus triggering symbol is visually modified to display at least one bonus symbol.

14. The gaming device of claim 13, wherein the display device visually modifies at least one bonus triggering symbol to display at least one different bonus symbol.

15. A gaming device comprising:

a first random generation by a processor that generates at least one bonus triggering symbol and at least one non-bonus triggering symbol;

a second random generation by the processor which occurs if at least a predefined number of the bonus triggering symbols are generated by the first random generation, wherein the second random generation generates a number of bonus symbols from a set of bonus symbols, the number being dependent upon the number of bonus triggering symbols generated in the first random generation wherein each said bonus triggering symbol causes a random generation of at least one of said bonus symbols;

an award provided to a player depending upon whether a predefined combination of bonus symbols is generated in the second random generation; and a display device controlled by the processor for displaying the bonus triggering symbols, the non-bonus triggering symbols, bonus symbols, and the award.

16. The gaming device of claim 15, wherein the at least one bonus triggering symbol, the at least one non-bonus triggering symbol and the number of bonus symbols appear on the same display device.

17. The gaming device of claim 15, wherein each bonus triggering symbol randomly changes to one of the set of different bonus symbols upon the generation of the predefined number of bonus triggering symbols.

18. The gaming device of claim 15, wherein the number of generated bonus symbols differs from an amount of bonus triggering symbols generated by the first random generation.

19. The gaming device of claim 15, wherein the set includes an amount of different bonus symbols that equals the predefined number of the bonus triggering symbols required to generate the bonus symbols.

20. The gaming device of claim 15, wherein the set includes an amount of different bonus symbols that differs from the predefined number of the bonus triggering symbols required to generate the bonus symbols.

21. The gaming device of claim 15, wherein the award is provided when the second random generation generates at least one of a plurality of predefined combinations of bonus symbols including no like bonus symbols, two like bonus symbols, two pairs of like bonus symbols, three like bonus symbols, three like first bonus symbols and two like second bonus symbols, four like bonus symbols and five like bonus symbols.

22. The gaming device of claim 21, which includes an award associated with each said combination of bonus symbols.

23. A gaming device comprising:

a primary game;

a plurality of primary game symbols in said primary game, said primary game symbols including a plurality of bonus triggering symbols and a plurality of non-bonus triggering symbols;

a plurality of secondary game symbols;

at least one award associated with at least one combination of said secondary game symbols;

a display device; and a processor which controls the display device and controls said primary game, whereupon a generation of a minimum number of the bonus triggering symbols in said primary game, said processor randomly generates a plurality of said secondary game symbols based on the number of bonus triggering symbols generated in the primary game wherein each said bonus triggering symbol causes at least one of said secondary game symbols to be generated, and causes the display device to display the generated secondary game symbols, and provides the player any of said awards associated with the combination of the secondary symbols if formed by the generated secondary game symbols.

24. The gaming device of claim 23, which includes an award associated with each combination of secondary symbols.

25. A gaming device comprising:

a plurality of reels including at least two bonus triggering symbols;

a set of bonus symbols;

at least one award associated with a predefined combination of bonus symbols;

a plurality of selections;

a selector for enabling the player to pick a plurality of said selections;

a display device; and a processor which controls the display device, the selector, and the reels, and upon a generation and display of at least a number of the bonus triggering symbols on the reels, the processor:

(i) generates a number of bonus symbols randomly from the set, the number of bonus symbols based on the number of bonus triggering symbols which appear on the reels wherein each said bonus triggering symbol causes at least one of said bonus symbols to be generated, (ii) associates the generated bonus symbols with said selections and causes the display device to display said selections, (iii) enables the player to select a plurality of said displayed selections, (iv) causes the display device to display the generated bonus symbols associated with the selected selections, and (v) provides the player the award associated with the predefined combination if the predefined combination of bonus symbols is formed by the generated bonus symbols.

26. The gaming device of claim 25, wherein the reels and bonus symbols appear on the same display device.

27. The gaming device of claim 25, which includes a visual sequence on the display device associated with the change of the bonus triggering symbols to the selections associated with the bonus symbols generated by said bonus triggering symbols.

28. The gaming device of claim 25, wherein the predefined number of the bonus triggering symbols must be on an active payline associated with the reels to cause the processor to generate bonus symbols.

29. The gaming device of claim 25, wherein the predefined number of the bonus triggering symbols on the reels must be on adjacent reels.

30. The gaming device of claim 25, which includes a plurality of predefined combinations of bonus symbols including no like bonus symbols, two like bonus symbols, two pairs of like bonus symbols, three like bonus symbols, three like first bonus symbols and two like second bonus symbols, four like bonus symbols and five like bonus symbols.

31. The gaming device of claim 30, which includes an award associated with each said predefined combination.

32. A gaming device comprising:

a plurality of reels including at least two bonus triggering symbols;

a set of bonus symbols;

at least one award associated with a predefined combination of bonus symbols;

a plurality of selections;

a selector for enabling a player to pick said selections;

a display device; and a processor which communicates with the display device, the selector, and the reels, wherein the processor:

(i) randomly generates a plurality of bonus symbols from the set, the number of bonus symbols based on the number of bonus triggering symbols which appear on the reels, (ii) associates the generated bonus symbols with the selections, (iii) causes the display device to display the selections, (iv) enables the player to select the selections using the selector, (v) causes the display device to display the bonus symbols associated with the selected selections, and (vi) provides the player any award associated with the combination of the selected bonus symbols.

33. A gaming device comprising:

a primary game;

a plurality of primary game symbols in said primary game, said primary game symbols including a plurality of bonus triggering symbols and a plurality of non-bonus triggering symbols;

a plurality of secondary game symbols;

at least one award associated with at least one combination of said secondary game symbols;

a plurality of selections;

a selector for enabling a player to select said selections;

a display device; and a processor which controls the display device and the selector and controls said primary game, and upon a generation of a minimum number of the bonus triggering symbols in said primary game, said processor randomly generates a plurality of said secondary game symbols based on the number of bonus triggering symbols generated in the primary game wherein each said bonus triggering symbol causes at least one of said secondary game symbols to be generated, associates the generated secondary game symbols with the selections, enables the player to select at least one selection using the selector, causes the display device to display the selected secondary game symbols, and provides the player said award associated with said combination if provided by the selected secondary game symbols.

34. The gaming device of claim 33, which includes an award associated with each combination of secondary symbols.

35. A gaming device comprising:

a plurality of reels including a set of symbols, wherein said set of symbols include at least two bonus triggering symbols and a plurality of non-bonus triggering symbols;

a set of different bonus symbols;

at least one award associated with a predefined combination of said bonus symbols;

a display device; and a processor which controls the display device and the reels, and upon a generation and display of at least one of the bonus triggering symbols on the reels, the processor:

(i) randomly generates a number of bonus symbols from the set of different bonus symbols, wherein the number of bonus symbols generated is based on the number of bonus triggering symbols which appear on the reels wherein each said bonus triggering symbol causes at least one of said bonus symbols to be generated, (ii) causes the display device to display the generated bonus symbols, and (iii) provides the player any of said awards associated with the predefined combination of bonus symbols formed by the generated bonus symbols.

36. The gaming device of claim 35, wherein the predetermined combination of symbols is selected from a plurality of the following poker hands: one pair, two pair, three-of a-kind, full house, four-of a-kind, straight, straight flush, and royal flush.

37. The gaming device of claim 35, wherein the number of bonus symbols generated is greater than the number of bonus triggering symbols which appear on the reels.

38. The gaming device of claim 35, wherein the number of bonus symbols generated is less than the number of bonus triggering symbols which appear on the reels.

39. The gaming device of claim 35, which includes a different paytable associated with the different sets of symbols.

40. A gaming device comprising:

a plurality of reels including a plurality of bonus triggering symbols;

a set of bonus symbols;

at least one award associated with a predefined combination of bonus symbols;

a display device; and a processor which controls the display device and the reels, and upon a generation and display of a plurality of the bonus triggering symbols on the reels, the processor:

(i) randomly generates a number of bonus symbols from the set of bonus symbols wherein the number of bonus symbols is based on the number of bonus triggering symbols which appear on the reels wherein each of a plurality of said plurality of bonus triggering symbols causes at least one bonus symbol to be generated, (ii) causes the display device to display the generated bonus symbols, and (iii) provides the player the award associated with the predefined combination if the predefined combination of bonus symbols is formed by the generated bonus symbols.

41. A gaming device comprising:

a plurality of reels a plurality of at least two different bonus triggering symbols;

a set of bonus symbols;

at least one award associated with a predefined combination of bonus symbols;

a display device; and a processor which controls the display device and the reels, and, upon a generation and display of a predetermined plurality of the bonus triggering symbols on the reels, the processor:

(i) randomly generates a plurality of bonus symbols from the set of bonus symbols wherein the number of bonus symbols is based on the number of bonus triggering symbols which appear on the reels and wherein each of said different bonus-triggering symbols causes at least one of said bonus symbols to be generated, (ii) causes the display device to display the generated bonus symbols, and (iii) provides the player the award associated with the predefined combination if the predefined combination of bonus symbols is formed by the generated bonus symbols.

* * * * *